April 11, 1944.  R. TAMPIER  2,346,280
AIRCRAFT
Filed April 5, 1939  3 Sheets-Sheet 1

Inventor
René Tampier
by
A. Knight Stewart
Attorney

Patented Apr. 11, 1944

2,346,280

UNITED STATES PATENT OFFICE 2,346,280

AIRCRAFT

René Tampier, London, England

Application April 5, 1939, Serial No. 266,143
In France April 8, 1938

4 Claims. (Cl. 244—102)

This invention relates to aircraft and in particular to apparatus for operating retractible undercarriages of aircraft.

In my pending patent application Serial No. 266,142 filed April 5, 1939, I have described and claimed in connection with multi-engined aircraft an arrangement of inclinable and reversible pitch propellers and means for varying the inclination of some of the propellers and varying the pitch of other of the propellers in such a way as to cancel partly or completely the tractive force on the aircraft and to provide instead a lifting force.

The object of the present invention is to provide a simple and reliable apparatus for operating a retractible undercarriage when fitted to a multi-engined aircraft having inclinable propellers.

With this object in view, according to the present invention, the retractible undercarriage comprises two wheels, supports on which said wheels are carried, bearings in which said supports are rotatably mounted, a driving connection operatively disposed between the inclinable propellers and said supports, whereby, when the propellers are rocked, the supports are rotated and swing the wheels carried thereon in a plane transverse to the axes of the supports into or out of the retracted position.

Thus, when the propellers are moved into their inclined positions for the purpose of landing, the said landing wheels of the undercarriage are moved out of the retracted position and into the landing position, and when the propellers are moved out of the inclined positions the landing wheels are moved into the retracted position.

The inclinable propellers may be mounted on side engine frames fixed to a shaft extending transversely of the fuselage and parallel with a shaft carrying a front landing wheel, a single drive being provided for the two shafts, whereby the two shafts and consequently the engine frames and all three landing wheels are simultaneously operated.

The single drive may comprise shafting extending fore and aft of the aircraft and operatively connected to the two parallel shafts and means for rotating said fore and aft shafting.

The shaft on which the two engine frames are fixed may be operatively connected to the arms carrying two of the landing wheels through gearing comprising gear elements fixed respectively to the engine frames so as to move therewith and gear wheels meshing with these gear elements and fixed respectively to the arms carrying the said two landing wheels.

The invention is illustrated in the accompanying drawings, wherein.

Figure 1:
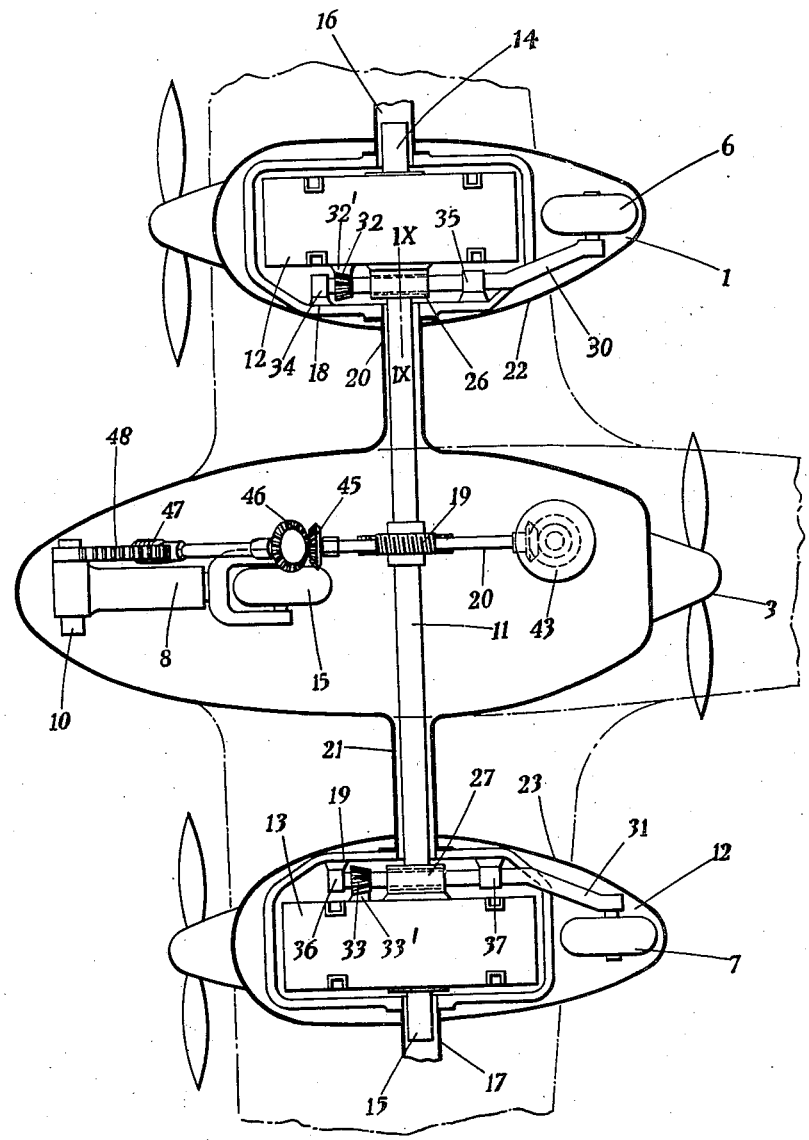
Figure 1 is a diagrammatic plan view illustrating the arrangement of mechanism for carrying out the present invention.
Figure 9:
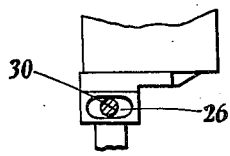
Figure 9 is a section on line IX—IX, Figure 1.
Figure 2:
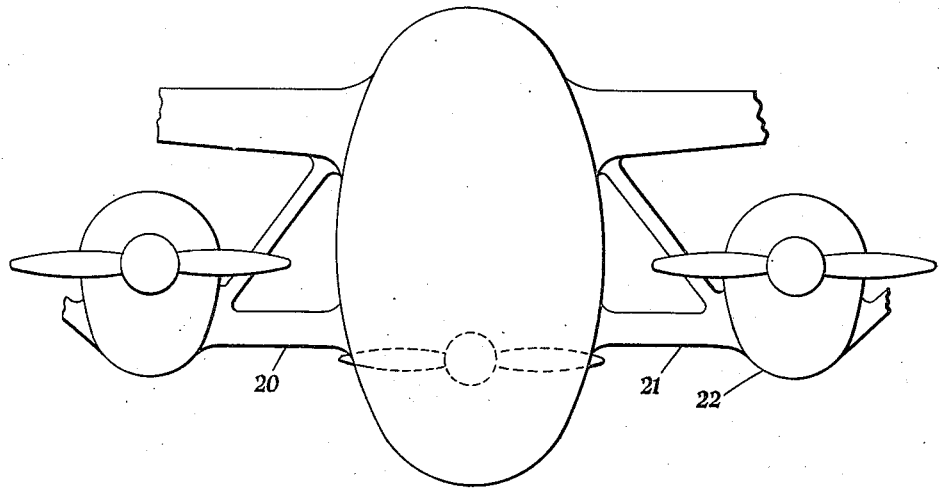
Figure 2 is a front view illustrating the general arrangement of the three engines of the aircraft.
Figure 3:
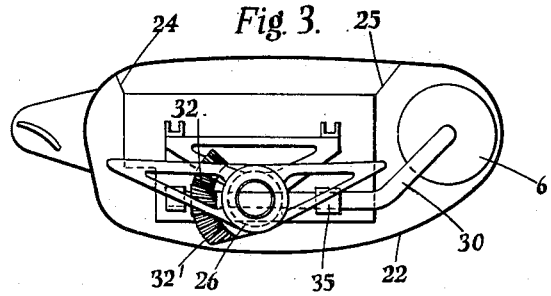
Figures 3 and 4 are diagrammatic side elevations of a side engine nacelle showing the operating mechanism in the two positions of the side landing wheels.
Figure 4:
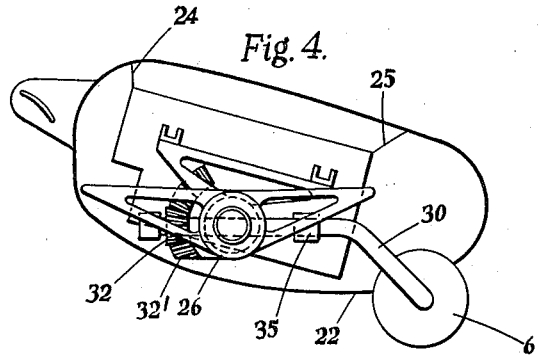

The drawings illustrate the application of the invention to a tri-engined aeroplane the engines of which are mounted in engine nacelles 1, 2, 3, respectively. The retractible undercarriage comprises a front landing wheel 5, disposed centrally of the fuselage, and two rear or side landing wheels 6, 7 disposed respectively at the rear of the engine nacelles 1, 2. The front wheel 5 is mounted on one end of an arm 8, the other end of which is fixed on, so as to rotate with, a shaft 10, extending transversely of the fuselage. A second shaft 11 extends across the fuselage and fixedly carries at each end a movable frame 12 or 13 each supporting a side engine, the ends of the shaft 11 extending beyond the outer sides of the frames 12, 13 and forming trunnions 14, 15 mounted in bearings 16, 17 carried on fixed frames 18, 19 surrounding the movable frames 12, 13. The fixed frames 18, 19 also carry bearings 20, 21 for supporting the shaft 11 at the point of entry into the engine cowlings 22, 23 which are respectively fixed to the movable frames 12, 13 by connecting members 24, 25 (Figs. 3 and 4). The shaft 11 is provided with bosses 26, 27 adjacent the movable frames and these bosses are provided with elongated transverse borings 28, 29 to receive arms 30, 31 carrying respectively the two side landing wheels 6, 7. Bevel gear wheels 32, 33 are fixed respectively to the other ends of the arms 30, 31 and are in permanent mesh respectively with gear quadrants 32', 33' carried on the sides of the movable frames 12, 13. The arms 30, 31 are additionally supported in bearings 34, 35 and 36, 37 carried on the fixed frames 18, 19.

A toothed sector 40 on the shaft 11 is driven by a worm 41 on a main driving shaft 42 driven through gearing from a motor 43. An inclined shaft 44 takes the drive through bevel gearing 45, 46 from the shaft 42 and drives worm 47 on the shaft 44, the worm 47 being in mesh with a toothed sector 48 fixed to the shaft 10.

Figure 5:
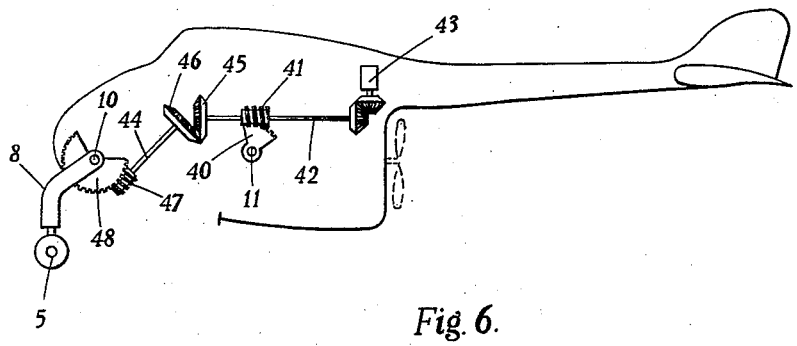
Figures 5 and 6 are diagrammatic longitudinal views illustrating the operation of the front wheel of the retractible landing carriage.
Figure 6:
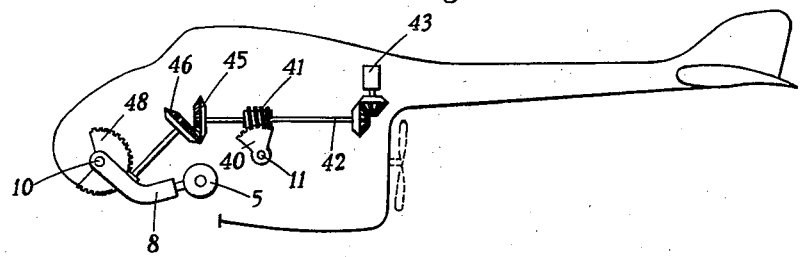
Figure 7:
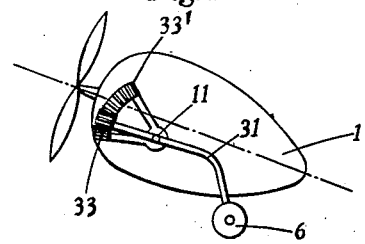
Figures 7 and 8 are detail views clearly illustrating the operating connection between the side engines and the two side wheels of the retractible landing carriage.
Figure 8:
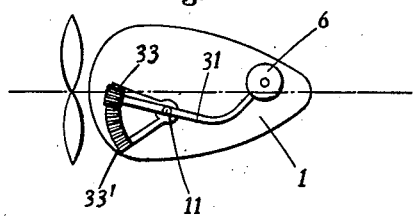

Figure 5 illustrates the front landing wheel 5 in the lowered position, and Figures 4 and 7 illustrate a rear landing wheel 6 in the lowered position. Figure 6 and Figures 3 and 8 illustrate, respectively, the same two wheels in the raised positions, i. e. the normal flight position. The operation is as follows:

In normal flight the landing wheels are in the retracted position as shown in Figures 1, 2, 3, 6 and 8. When it is desired to land the aircraft the motor 43 is put in operation and rotates, through the shafting and gearing described, the two shafts 10 and 11. Rotation of the shaft 10 rotates the front landing wheel 5 into the position shown in Figure 5. Rotation of the shaft 11 rocks the movable engine frames 12, 13 into an inclined position as shown in Figures 4 and 7, this movement being permitted relatively to the arms 30, 31 by reason of the elongated borings 28, 29 in the bosses 26, 27. The two gear quadrants 32′, 33′ share this rocking movement of the engine frames 12, 13 and consequently rotate the bevel wheels 32, 33 to revolve the arms 30, 31 around their axes, thereby rotating the landing wheels 6, 7 in a plane transverse to the axes of the arms into the landing position shown in Figures 4 and 7. For retracting the landing wheels the motor 43 is driven in the opposite direction.

The two engine nacelles 1, 2 are rocked into an inclined position for landing to incline correspondingly the engine propellers for the purpose described in my above mentioned patent application Serial No. 266,142. When the present invention is used in combination with the invention of my said patent application, therefore, a single drive and transmission may be employed for inclining the propellers and for operating the landing gear.

The scope of the invention is in no way limited to the particular gears shown in the drawings. For example, the worm gearing may be replaced by rack and pinion devices. When worm gearing is employed the pitch of the gearing may be designed to provide either a reversible or irreversible drive.

What I claim is:

1. In an aircraft, a shaft extending transversely of the fuselage, two side engine frames fixed to said shaft, a propeller mounted on each of said side engine frames, means for rocking said shaft to rock the side engine frames and propellers, a retractible undercarriage comprising two wheels, supports on which said wheels are carried, bearings in which said supports are rotatably mounted, a driving connection operatively disposed between the side engine frames and said supports, whereby, when the said shaft and engine frames are rocked, the supports are rotated and swing the wheels carried thereon in a plane transverse to the axes of the supports into or out of the retracted position.

2. In an aircraft a first shaft extending transversely of the fuselage, two side engine frames fixed to said first shaft, a propeller mounted on each of said side engine frames, means for rocking said first shaft to rock the side engine frames and propellers, a second shaft disposed in parallel relationship with the shaft first mentioned, means for rocking said second shaft simultaneously with the first shaft, a retractible undercarriage comprising three landing wheels, supports on which said wheels are carried, one of which is fixed to the said second shaft, bearings in which the other two supports are rotatably mounted, a driving connection operatively disposed between the side engine frames and said two supports whereby when the propellers are rocked the said two supports are rotated and swing the wheels carried thereon in a plane transverse to the axes of the supports into or out of the retracted position, the third support being rocked in its own vertical plane to operate simultaneously the third landing wheel.

3. In an aircraft a first shaft extending transversely of the fuselage, two side engine frames fixed to said first shaft, a propeller mounted on each of said side engine frames, means for rocking said first shaft to rock the side engine frames and propellers, a second shaft disposed in parallel relationship with the shaft first mentioned, shafting extending fore and aft of the aircraft and operatively connected to the said first and second shafts, means for rotating said fore and aft shafting to rock simultaneously the said first and second shafts, a retractible undercarriage comprising three landing wheels, supports on which said wheels are carried, one of which is fixed to said second shaft, bearings in which the other two supports are rotatably mounted, a driving connection operatively disposed between the side engine frames and said two supports whereby when the propellers are rocked the said two supports are rotated and swing the wheels carried thereon in a plane transverse to the axes of the supports into or out of the retracted position, the third support being rocked in its own vertical plane to operate simultaneously the third landing wheel.

4. In an aircraft a first shaft extending transversely of the fuselage, two side engine frames fixed to said first shaft, a propeller mounted on each of said side engine frames, means for rocking said first shaft to rock the side engine frames and propellers, a second shaft disposed in parallel relationship with the shaft first mentioned, shafting extending fore and aft of the aircraft and operatively connected to the said first and second shafts, means for rotating said fore and aft shafting to rock simultaneously the said first and second shafts, a retractible undercarriage comprising three landing wheels, supports on which said wheels are carried, one of which is fixed to the said second shaft, bearings in which the other two supports are rotatably mounted, a driving connection operatively disposed between each side engine frame and each of the said two supports, and comprising a gear element fixed to the engine frame so as to move therewith and a gear wheel meshing with said gear element and fixed to the support, whereby, when the propellers are rocked the said two supports are rotated and swing the wheels carried thereon in a plane transverse to the axes of the supports into or out of the retracted position, the third support being rocked in its own vertical plane to operate simultaneously the third landing wheel.

RENÉ TAMPIER.